United States Patent
Kim et al.

(10) Patent No.: US 9,087,511 B2
(45) Date of Patent: Jul. 21, 2015

(54) METHOD, MEDIUM, AND SYSTEM FOR GENERATING A STEREO SIGNAL

(75) Inventors: Junghoe Kim, Yongin-si (KR); Eunmi Oh, Yongin-si (KR); Kihyun Choo, Yongin-si (KR); Miao Lei, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1941 days.

(21) Appl. No.: 11/707,989

(22) Filed: Feb. 20, 2007

(65) Prior Publication Data

US 2007/0223709 A1    Sep. 27, 2007

Related U.S. Application Data

(60) Provisional application No. 60/778,933, filed on Mar. 6, 2006.

(30) Foreign Application Priority Data

May 30, 2006 (KR) .......................... 10-2006-0049035
Nov. 10, 2006 (KR) .......................... 10-2006-0111240

(51) Int. Cl.
*H04R 5/00* (2006.01)
*G10L 19/008* (2013.01)
*H04S 1/00* (2006.01)
(Continued)

(52) U.S. Cl.
CPC .............. *G10L 19/008* (2013.01); *H04S 1/007* (2013.01); *H04S 3/008* (2013.01); *H04S 7/308* (2013.01); *H04S 2420/03* (2013.01)

(58) Field of Classification Search
CPC ..... H04S 1/007; H04S 7/308; H04S 2420/03; H04S 3/002; H04S 3/004; H04S 3/006; H04S 3/008; H04S 3/02; G10L 19/008; G10L 19/12; H03S 3/008
USPC .................. 381/1–23, 27, 307, 311; 704/500
See application file for complete search history.

(56) References Cited

U.S. PATENT DOCUMENTS

| 7,305,097 B2 * | 12/2007 | Rosen et al. .................. 381/307 |
| 7,394,903 B2 * | 7/2008 | Herre et al. ..................... 381/23 |
| 7,447,629 B2 * | 11/2008 | Breebaart ..................... 704/219 |

(Continued)

FOREIGN PATENT DOCUMENTS

| JP | 2004-078183 | 3/2004 |
| KR | 10-2010-0115801 | 12/2005 |

(Continued)

OTHER PUBLICATIONS

Eric D. Scheirer et al., "AudioBIFS: Describing Audio Scenes with the MPEG-4 Multimedia Standard", IEEE Transactions on Multimedia, vol. 1, No. 3, Sep. 1999.

(Continued)

*Primary Examiner* — Xu Mei
(74) *Attorney, Agent, or Firm* — Sughrue Mion, PLLC

(57) ABSTRACT

Surround audio decoding for selectively generating an audio signal from a multi-channel signal. In the surround audio decoding, a down-mixed signal, e.g., as down-mixed by an encoding terminal, is selectively up-mixed to a stereo signal or a multi-channel signal, by generating spatial information for generating the stereo signal, using spatial information for up-mixing the down-mixed signal to the multi-channel signal.

31 Claims, 4 Drawing Sheets

(51) Int. Cl.
*H04S 3/00* (2006.01)
*H04S 7/00* (2006.01)

(56) References Cited

U.S. PATENT DOCUMENTS

| | | | |
|---|---|---|---|
| 7,573,912 B2 * | 8/2009 | Lindblom | 370/487 |
| 7,711,552 B2 | 5/2010 | Villemoes | |
| 7,720,230 B2 * | 5/2010 | Allamanche et al. | 381/22 |
| 7,983,424 B2 * | 7/2011 | Kjorling et al. | 381/22 |
| 8,577,686 B2 * | 11/2013 | Oh et al. | 704/500 |
| 2003/0219130 A1 | 11/2003 | Baumgarte et al. | |
| 2005/0074127 A1 | 4/2005 | Herre et al. | |
| 2005/0157883 A1 | 7/2005 | Herre et al. | |
| 2005/0195981 A1 | 9/2005 | Faller et al. | |
| 2005/0271214 A1 | 12/2005 | Kim | |
| 2006/0093164 A1 * | 5/2006 | Reams et al. | 381/119 |
| 2006/0153408 A1 | 7/2006 | Faller et al. | |
| 2006/0233380 A1 * | 10/2006 | Holzer et al. | 381/23 |
| 2007/0223709 A1 | 9/2007 | Kim et al. | |
| 2009/0319281 A1 | 12/2009 | Baumgarte et al. | |

FOREIGN PATENT DOCUMENTS

| | | |
|---|---|---|
| KR | 10-2007-0091518 | 9/2007 |
| WO | WO 02/07481 | 1/2002 |
| WO | WO 2005/036925 | 4/2005 |
| WO | WO 2005/101370 | 10/2005 |
| WO | WO 2005101371 A1 * | 10/2005 |

OTHER PUBLICATIONS

International Search Report dated Jun. 14, 2007, corresponds to PCT International Application No. PCT/KR2007/001067.
Notice of Allowability dated Sep. 20, 2007 corresponds to Korean Patent Application No. 10-2006-0111240.
Notice of Allowability dated May 31, 2007 corresponds to Korean Patent Application No. 10-200-0067133.
Korean Office Action dated Mar. 8, 2011 corresponds to Korean Patent Application No. 10-2007-0067133.
European Search Report issued Nov. 28, 2011 corresponds to European Patent Application No. 07715471.4.
Korean Notice of Allowance dated Sep. 20, 2007 corresponds to Korean Patent Application No. 10-2006-0111240.

* cited by examiner

ND SYSTEM FOR
METHOD, MEDIUM, AND SYSTEM FOR GENERATING A STEREO SIGNAL

CROSS-REFERENCE TO RELATED APPLICATIONS

This application claims the benefits of U.S. Patent Application No. 60/778,933, filed on Mar. 6, 2006, in the U.S. Patent and Office and, Korean Patent Application No. 10-2006-0049035, filed on May 30, 2006 and No. 10-2006-0111240, filed on Nov. 10, 2006, in the Korean Intellectual Property Office, the disclosures of which are incorporated herein in their entireties by reference.

BACKGROUND OF THE INVENTION

1. Field of the Invention

One or embodiments of the present invention relate to audio decoding, and more particularly, to a surround audio decoding method, medium, and system for selectively decoding an audio signal to a stereo signal or a multi-channel signal.

2. Description of the Related Art

In general, multi-channel audio coding is classified into waveform multi-channel audio coding and parametric multi-channel audio coding. The waveform multi-channel audio decoding includes MPEG-2 MC audio coding, MC MC audio coding, BSAC/AVS MC audio coding, etc., and typically receives 5 encoded channel signals and outputs 5 decoded channel signals. The parametric multi-channel audio decoding typically includes MPEG surround coding, and a decoding terminal would receive 1 or 2 input encoded channel signals and outputs 6 or 8 decoded multi-channel signals.

According to an MPEG surround specification, an input encoded signal can be decoded as a multi-channel signal through a first 5-1-5 tree structure, illustrated in FIG. 1A, and a second 5-1-5 tree structure, illustrated in FIG. 1B. Here, the tree structures receive a down-mixed mono signal, i.e., a signal that has been encoded from multi-channel signals and output as a mono signal, and up-mixes the mono signal to multi-channel signals of a Front Left (FL) channel, a Front Right (FR) channel, a Center (C) channel, a Low Frequency Enhancement (LFE) channel, a Back Left (BL) channel, and a Back Right (BR) channel, using combinations of 1-to-2 (OTT) modules. Here, the up-mixing of the mono signal through the stages of OTT modules can be accomplished with previously generated spatial information of Channel Level Differences (CLDs) and/or Inter-Channel Correlations (ICCs), with the CLD being information about an energy ratio or difference between predetermined channels in multi-channels, and with the ICC being information about correlation or coherence corresponding to a time/frequency tile of input signals. With respective CLDs and ICCs, each staged OTT can up-mix a single input signal to respective output signals through each staged OTT.

However, due to increases in use of mobile applications, rather than the multi-channel signals, a stereo channel structure is more frequently used than the multi-channel structure. Thus, there is a problem in that the conventional tree structures do not provide an easy computational simplified technique for generating just the stereo channels, i.e., all channels must typically be decoded by performing the entire staged decoding of the input down-mixed mono signal. For example, referring to FIG. 1A, in the first 5-1-5 tree structure, the corresponding $OTT_0$ module outputs a signal that includes information for a FL channel signal, a FR channel signal, a C channel signal, and a LFE channel signal, and a signal that includes information for a BL channel signal and a BR channel signal. Meanwhile, referring to FIG. 1B, in the second 5-1-5 tree structure, the corresponding $OTT_0$ module outputs a signal that includes information for the FL channel signal, the BL channel signal, the FR channel signal, and the BR channel signal and a signal that includes information for the C channel signal and the LFE channel signal.

For this reason, in these 5-1-5 tree structures, the signals output from the corresponding $OTT_0$ modules cannot be suitably used for generation of a left and right channel stereo signal. Rather, additional decoding through the remaining OTT modules stages must be performed to ultimately decode the left and right channels, requiring additional computations and resources.

SUMMARY

One of more embodiments of the present invention include a stereo signal generating method, medium, and system, for up-mixing a down-mixed signal to a stereo signal, by generating spatial information for up-mixing the down-mixed signal to the stereo signal, using existing spatial information for up-mixing the down-mixed signal to a multi-channel signal.

Additional aspects and/or advantages of the invention will be set forth in part in the description which follows and, in part, will be apparent from the description, or may be learned by practice of the invention.

According to an aspect of the present invention, one or embodiments of the present invention include a method for generating a stereo signal, including generating spatial information for up-mixing a down-mixed signal to the stereo signal, using spatial information for up-mixing the down-mixed signal to a multi-channel signal other than the stereo signal, and up-mixing the down-mixed signal to the stereo signal using the generated spatial information.

According to another aspect of the present invention, one or embodiments of the present invention include a method for generating an audio signal, including selectively up-mixing a down-mixed signal to at least one of a multi-channel signal and a stereo signal, wherein up-mixing of the down-mixed signal to the multi-channel signal is accomplished through a multi-staged up-mixing of the down-mixed signal based upon spatial information for up-mixing the down-mixed signal to the multi-channel signal, and wherein up-mixing of the down-mixed signal to the stereo signal is accomplished by generating spatial information for the up-mixing of the down-mixed signal to the stereo signal based on the spatial information for up-mixing the down-mixed signal to a multi-channel signal and applying the generated spatial information to a single stage to up-mix the down-mixed signal to the stereo signal.

According to another aspect of the present invention, one or embodiments of the present invention include at least one medium including computer readable code to control at least one processing element to implement an embodiment of the present invention.

According to another aspect of the present invention, one or embodiments of the present invention include an system for generating a stereo signal, including a spatial information generator to generate spatial information for up-mixing a down-mixed signal to the stereo signal, using spatial information for up-mixing the down-mixed signal to a multi-channel signal other than the stereo signal, and an up-mixing unit to up-mix the down-mixed signal to the stereo signal, using the generated spatial information.

According to another aspect of the present invention, one or embodiments of the present invention include an system for generating an audio signal, including a plurality of up-mixing modules to selectively up-mix a down-mixed signal to at least one of a stereo signal and a multi-channel signal, and a spatial information generator to generate spatial information for up-mixing the down-mixed signal to the stereo signal, using spatial information for up-mixing the down-mixed signal to the multi-channel signal, wherein up-mixing of the down-mixed signal to the multi-channel signal is accomplished through staged up-mixing by the plurality of up-mixing modules based upon the spatial information for up-mixing the down-mixed signal to the multi-channel signal, and wherein up-mixing of the down-mixed signal to the stereo signal is accomplished through a single up-mixing by one of the plurality of up-mixing modules based upon the generated spatial information for the up-mixing of the down-mixed signal to the stereo signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1A:
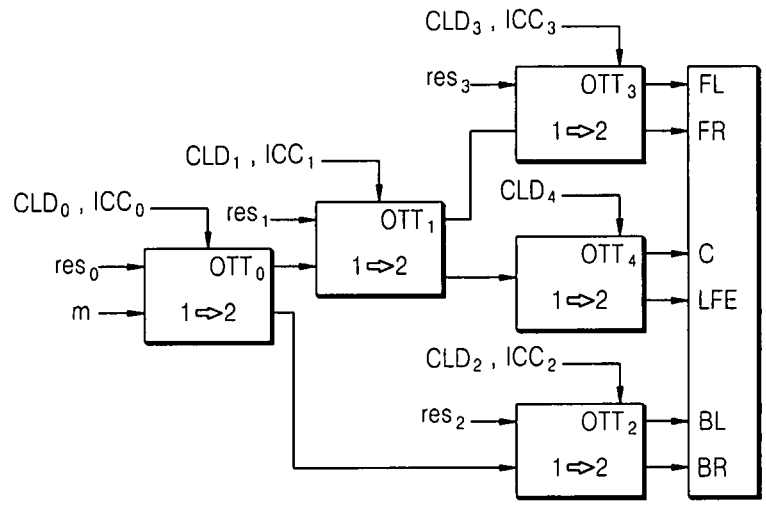
FIGS. 1A and 1B illustrate conventional first and second 5-1-5 tree structures for decoding a multi-channel signal from a down-mixed signal, respectively.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2A:
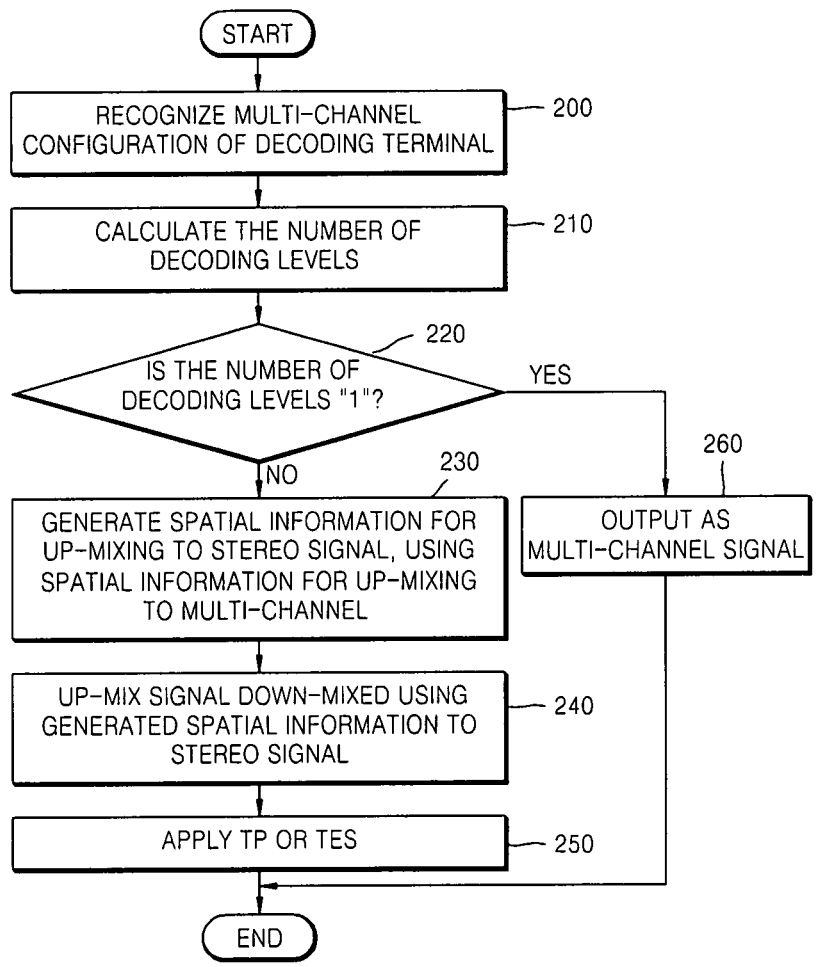
FIG. 2A illustrates a stereo signal generating method, according to an embodiment of the present invention.

FIG. 2A illustrates a stereo signal generating method, according to an embodiment of the present invention.

Referring to FIG. 2A, a desired multi-channel configuration of a decoding terminal is recognized, in operation 200. The desired multi-channel configuration of the decoding terminal may be based on the number of speakers included in the decoding terminal, the locations of operable speakers among the speakers included in the decoding terminal, information for channel signals available in the decoding terminal among multi-channel signals encoded in an encoding terminal, available processing power for decoding an input down-mixed signal, etc., noting that alternative reasons for desiring only a stereo decoded signal are equally available.

The number of decoding levels may then be determined, e.g., using such an example of the multi-channel configuration of the decoding terminal recognized in operation 200, in operation 210.

Here, in one example, if it is determined that the number of levels calculated in operation 210 is "1", in operation 220, spatial information for generating a stereo signal can be generated using pre-existing spatial information for decoding of the down-mixed signal to multi-channel signals, e.g., as generated in an encoding terminal, in operation 230. Here, in this example, since the case when the number of levels is "1" corresponds to the case when a single OTT module is used, it may be determined that an output of only a stereo channel is desired. As noted above, the existing spatial information for up-mixing the down-mixed mono signal to multi-channel signals may be Channel Level Differences (CLDs) or Inter-Channel Correlations (ICCs), noting that embodiments of the present invention is not limited to these types of spatial information.

The CLDs are information about an energy ratio or difference between predetermined channels in multi-channels, and are energy ratios corresponding to a time/frequency tile of input signals. Respective CLDs can be calculated by the following Equation 1, for example.

$$CLD = 10\log 10 \left( \frac{\sum_n \sum_m x_1^{n,m} x_1^{n,m*}}{\sum_n \sum_m x_2^{n,m} x_2^{n,m*}} \right) \quad \text{Equation 1}$$

Here, x1 and x2 denote signals input to a corresponding 2-to-1 encoder from a subband domain, n denotes a time slot index, m denotes a subband index, and * denotes complex conjugate.

The ICC is information about correlation or coherence corresponding to a time/frequency tile of input signals, i.e., a similarity between signals.

Similar to above, respective ICCs can be calculated by the following Equation 2.

$$ICC = \text{Re}\left\{ \frac{\sum_n \sum_m x_1^{n,m} x_2^{n,m*}}{\sqrt{\sum_n \sum_m x_1^{n,m} x_1^{n,m*} \sum_n \sum_m x_2^{n,m} x_2^{n,m*}}} \right\} \quad \text{Equation 2}$$

Here, x1 and x2 denote signals input to a corresponding 2-to-1 encoder from a subband domain, n denotes a time slot index, m denotes a subband index, and * denotes complex conjugate.

If the aforementioned example number of levels is not "1", the input mono signal may, thus, be decoded and output as a multi-channel signal, e.g., according to the multi-channel configuration of the decoding terminal recognized in operation 200, using such existing CLDs and/or ICCs, in operation 260.

Conversely, if the aforementioned example number of levels is "1", then, the input down-mixed signal can be up-mixed using the below discussed spatial information generated in operation 230 for up-mixing to a stereo signal, in operation 240.

Successively, temporal processing (TP) or temporal envelope shaping (TES) may then be applied to the up-mixed stereo signal, in operation 250. Here, operation 250 may be omitted in some embodiments.

Figure 2B:
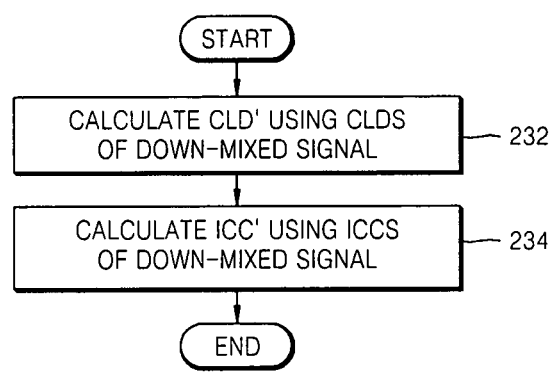
FIG. 2B illustrates a method for generating spatial information for up-mixing a down-mixed signal to a stereo signal, according to an embodiment of the present invention.

FIG. 2B illustrates an operation of generating spatial information for the up-mixing of the down-mixed mono signal to a stereo signal using the pre-existing spatial information for up-mixing the down-mixed mono signal to multi-channel signals, such as for operation 230, according to an embodiment of the present invention.

Figure 1B:
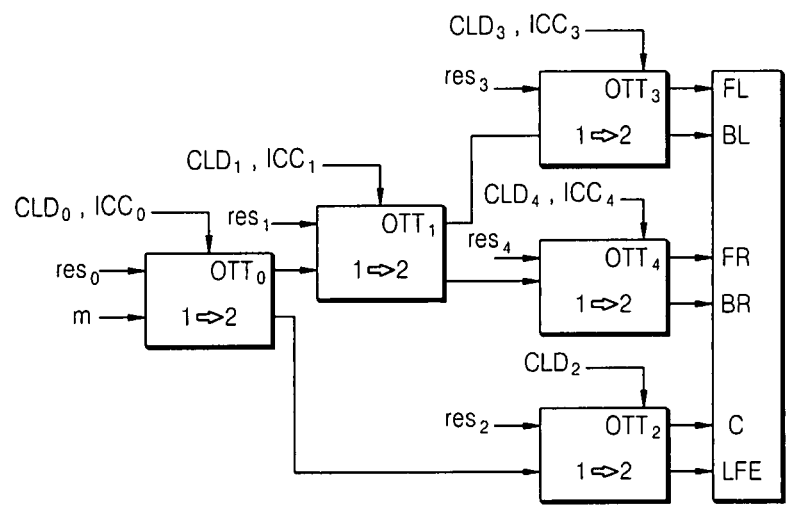

Referring to FIG. 2B, a CLD' for generating the stereo signal may be calculated using the pre-existing CLDs of the signal down-mixed from the multi-channel signals, such as generated in an encoding terminal, in operation 232. Here, the CLD is not an energy decibel difference between two channels but an energy ratio between two channels. Thus, in operation 232, when the CLD' is calculated, if a CLD of the $OTT_1$ module illustrated in FIGS. 1A and 1B is "1", the CLD' is set to "1", in one embodiment. Meanwhile if the CLD of the $OTT_1$ module is not "1", the CLD' can be calculated by the following Equation 3, for example.

$$CLD' = (P_{FL} + P_{BL} + 0.5P_{FC})/(P_{FR} + P_{BR} + 0.5P_{FC})^d$$
$$= [P_{FL} + P_{BL} + 0.5(P_{FL} + P_{BL} + P_{FR} + P_{BR})/4]$$
$$[P_{FR} + P_{BR} + 0.5(P_{FL} + P_{BR} + P_{FR} + P_{BR})/4]$$
$$= [CLD_1 + (1+CLD_1)/8CLD_0]/[1+(1+CLD_1)/8CLD_0]^d$$
$$= [1 + CLD_1 + 8CLD_0 CLD_1]/[1 + CLD_1 + 8CLD_0]^d$$

Equation 3

Here, PFL denotes energy of a FL channel, PBL denotes energy of a BL channel, PFC denotes energy of a FC channel, PFR denotes energy of a FR channel, and PBR denotes energy of a BR channel. Further, $CLD_0$ denotes such a CLD as that of the $OTT_0$ module illustrated in FIGS. 1A and 1B, and $CLD_1$ denotes such a CLD as that of the $OTT_1$ module illustrated in FIGS. 1A and 1B, for example.

Then, an ICC' for generating the stereo signal may be calculated using the pre-existing CLDs or ICCs of the signal down-mixed from the multi-channel signals, such as generated in an encoding terminal, in operation 234.

In one embodiment, in operation 234, the ICC' may be calculated using the techniques described below.

Firstly, an ICC' may be calculated using linear interpolation. Here, the ICC' can be calculated by the following Equation 4, for example.

$$ICC' = \alpha * ICC_a + (1-\alpha) * ICC_b \qquad \text{Equation 4}$$

Here, ICCx denotes an ICC of an OTTx module, CLDx denotes a CLD of the OTTx module, and a may be a constant.

Secondly, a corresponding ICC' may be read using a look-up table. Here, the ICC' can be read by the following Equation 5, for example.

$$ICC' = LUT(ICC_0, \ldots, ICC_N, CLD_0, \ldots, CLD_N) \qquad \text{Equation 5}$$

Here, ICCx denotes an ICC of an OTTx module and CLDx denotes a CLD of the OTTx module.

The ICC' corresponding to the ICC0, . . . , ICCN, CLD0, . . . , CLDN may then be searched for and read from a prepared look-up table. However, it is also possible to use only a specific ICCx or CLDx instead of using all of the ICC0, . . . , ICCN, CLD0, . . . , CLDN.

Thirdly, the ICC' may be calculated using correlation of ICCs. For example, in the aforementioned second 5-1-5 tree structure, the ICC' may be calculated by the following Equation 6.

$$ICC' = \frac{\sqrt{CLD_1}\,ICC_1 + a(1+CLD_1)\sqrt{\frac{CLD_0}{b}}\,ICC_0 + a^2\frac{CLD_0(1+CLD_1)}{b}}{\sqrt{CLD_1 + a^4\left(\frac{CLD_0}{b}(1+CLD_1)\right)^2 + a^2\frac{CLD_0}{b}(1+CLD_1)CLD_1 + a^2\frac{CLD_0}{b}(1+CLD_1)\left(1+\frac{1}{CLD_1}\right)}}$$

Equation 6

Here, $ICC_x$ is an ICC of an $OTT_x$ module, $CLD_x$ is a CLD of the $OTT_x$ module, and a and b may be constants.

In this example, the equation 6 can be derived using the following Equations 7-12.

$$ICC' = \frac{(L' + a \cdot C) \cdot (R'^* + a \cdot C'^*)}{\sqrt{(P_{L'} + P_C) \cdot (P_{R'} + P_C)}} \qquad \text{Equation 7}$$

$$CLD_0 = \frac{b(P_{L'} + P_{R'})}{P_C} \qquad \text{Equation 8}$$

$$CLD_1 = \frac{P_{L'}}{P_{R'}} \qquad \text{Equation 9}$$

$$ICC_0 = \frac{L'C^* + R'C^*}{\sqrt{(P_{L'} + P_{R'})P_C}} \qquad \text{Equation 10}$$

$$ICC_1 = \frac{L'R'}{\sqrt{P_{L'} P_{R'}}} \qquad \text{Equation 11}$$

$$(A+B)^2 = |A|^2 + |B|^2 + 2 \cdot A \cdot B = |A|^2 + |B|^2 + 2 \cdot ICC_{AB} \cdot |A| \cdot |B| \qquad \text{Equation 12}$$

Here, L' denotes a subband signal of a left channel of a target, R' denotes a subband signal of a right channel of the target, C' denotes a subband signal of a center channel of the target, PL' denotes energy of the left channel of the target, PR' denotes energy of the right channel of the target, PC' denotes energy of the center channel of the target, a is a constant, and * denotes complex conjugate. Here, a may be set to "1/squrt(2)" and b may be set to "1", for example.

The above Equation 6 can be obtained by substituting the Equations 1 through 11 for the Equation 12 using inner product principle.

Figure 3:
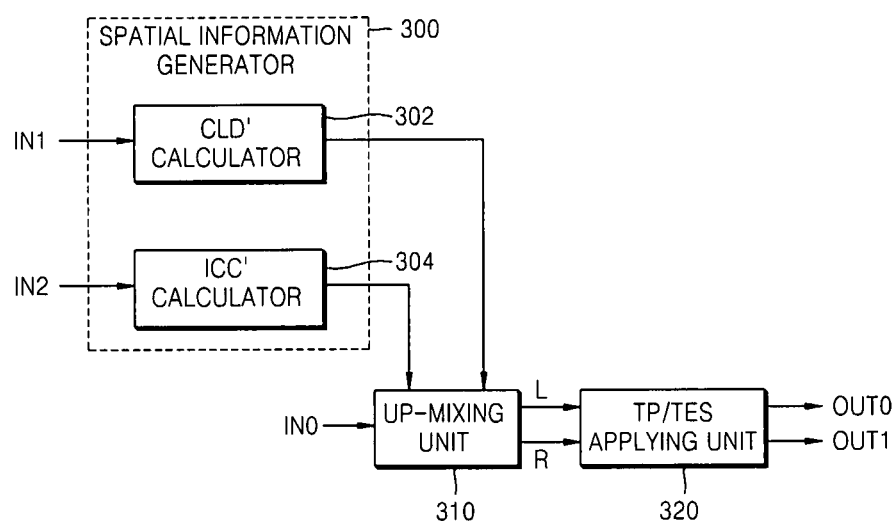
FIG. 3 illustrates a stereo signal spatial information generating component, according to an embodiment of the present invention.

FIG. 3 illustrates a spatial information generating component, as a spatial information generator 300, with an up-mixing unit 310, and a TP/TES applying unit 320, according to an embodiment of the present invention. In an embodiment of the present invention, such a configuration can be implemented in cooperation with the aforementioned first and second tree structures of FIGS. 1A and 1B, respectively.

The spatial information generator 300 generates spatial information for generating the stereo signal, using pre-existing spatial information for the input down-mixed mono signal, e.g., as previously generated during a down-mixing to the mono signal from multi-channel signals in an encoding terminal. Again, though the spatial information has been discussed as being CLDs or ICCs, embodiments of the present invention is not limited thereto.

Here, the spatial information generator 300 may include a CLD' calculator 302 and an ICC' calculator 304.

The CLD' calculator 302 may calculate a CLD' for generating the stereo signal, using pre-existing CLDs of the signal down-mixed from the multi-channel signals, such as generated in an encoding terminal, which may be received through an input terminal IN1, for example. Here, the CLD is not an energy decibel difference between two channels but an energy ratio between two channels. When the CLD' calculator 302 calculates the CLD', if a CLD of the OTT1 module illustrated in FIGS. 1A and 1B is "1", the CLD' is set to "1", in one embodiment. If the CLD of the OTT1 module is not "1", the CLD' can be calculated by the aforementioned Equation 3.

The ICC' calculator 304 may further calculate an ICC' for generating the stereo signal, using pre-existing CLDs or ICCs of the down-mixed signal, e.g., with the ICCs being received through an input terminal IN2. At this time, the ICC' can be calculated using any of the above techniques describe in Equations 4-12.

The up-mixing unit 310 may then up-mix a down-mixed signal, e.g., received through an input terminal IN0, to a stereo signal, using the spatial information generated by the spatial information generator 300, such as the CLD' calculated by the CLD' calculator 302 and the ICC' calculated by the ICC' calculator 304.

Figure 4:
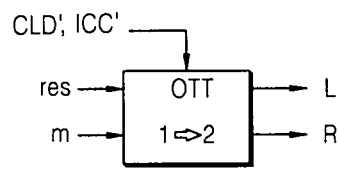
FIG. 4 illustrates a stereo outputting component, according to an embodiment the present invention.

FIG. 4 illustrates a component for outputting such a generated stereo signal, according to an embodiment the present invention. Referring to FIG. 4, a down-mixed mono signal m can be up-mixed using the spatial information generated by the spatial information generator 300, such as the CLD' calculated by the CLD' calculator 302 and the ICC' calculated by the ICC' calculator 304, to a left signal (L) and a right signal (R) by an OTT module, so that the stereo signal is generated.

The TP/TES applying unit 320 illustrated in FIG. 3 may further apply TP or TES to the stereo signal up-mixed by the up-mixing unit 310, for example. The TP/TES applying unit 320 may, thus, output the resultant signal to which the TP or TES is applied, as a left signal and a right signal, e.g., through an output terminal OUT1 and an output terminal OUT2, respectively.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

In a stereo signal generating method, medium, and system, according to an embodiment of the present invention, a down-mixed signal can be selectively up-mixed to a stereo signal, by generating spatial information for up-mixing the down-mixed signal to the stereo signal, using spatial information for up-mixing the down-mixed signal to a multi-channel signal.

Accordingly, since a down-mixed mono signal, e.g., as generated from a down-mixing of multi-channel signals in an encoding terminal, is up-mixed to be suitable for a stereo signal, it is possible to improve tone quality of the resultant stereo signal.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for generating a stereo signal, comprising:
    calculating, using at least one processor, first spatial information for up-mixing a down-mixed mono signal to the stereo signal, using second spatial information for up-mixing the down-mixed mono signal to a multi-channel signal other than the stereo signal; and
    up-mixing the down-mixed mono signal to the stereo signal using the calculated first spatial information for up-mixing the down-mixed mono signal to the stereo signal,
    wherein the second spatial information for up-mixing the down-mixed mono signal to the multi-channel signal other than the stereo signal pre-exists as being generated by an encoder that generates the down-mixed mono signal.

2. The method of claim 1, wherein the first spatial information for the up-mixing of the down-mixed mono signal to the stereo signal includes information about an energy ratio or difference between predetermined channels in multi-channels.

3. The method of claim 2, wherein the calculating of the first spatial information for the up-mixing of the down-mixed mono signal to the stereo signal comprises:
    summing an energy sum of multi-channels corresponding to a left channel with a value obtained by multiplying energy of a front center channel by a predetermined value, as a left channel sum;
    summing an energy sum of multi-channels corresponding to a right channel with a value obtained by multiplying energy of a front center channel by another predetermined value, as a right channel sum; and
    calculating the first spatial information for the up-mixing of the down-mixed mono signal to the stereo signal using a ratio of the left and right channel sums.

4. The method of claim 3, wherein in the calculating of the first spatial information for the up-mixing of the down-mixed mono signal to the stereo signal, the first spatial information for the up-mixing of the down-mixed mono signal to the stereo signal is calculated using the following equation:

$$CLD'=(P_{FL}+P_{BL}+a*P_{FC})/(P_{FR}+P_{BR}+b*P_{FC})$$

where CLD' is an energy ratio between channels included in the calculated first spatial information, PFL denotes energy of a front left (FL) channel, PBL denotes energy of a back left (BL) channel, PFC denotes energy of a front center (FC) channel, PFR denotes energy of a front right (FR) channel, PBR denotes energy of a back right (BR) channel, a and b are constants, and the * represents a multiplication operation.

5. The method of claim 1, wherein the first spatial information for the up-mixing of the down-mixed mono signal to the stereo signal includes information about correlation or coherence between predetermined channels in multi-channels.

6. The method of claim 5, wherein, in the calculating of the first spatial information for the up-mixing of the down-mixed mono signal to the stereo signal, the first spatial information for the up-mixing the down-mixed mono signal to the stereo signal is calculated by linear interpolation, using the correlation or coherence between the predetermined channels in the multi-channels.

7. The method of claim 6, wherein, in the calculating of the first spatial information for the up-mixing of the down-mixed mono signal to the stereo signal, the first spatial information for the up-mixing of the down-mixed mono signal to the stereo signal is calculated using the following equation:

$$ICC'=\alpha*ICC_a+(1\times\alpha)*ICC_b$$

where ICC' denotes the correlation or coherence between the predetermined channels, ICCx denotes correlation or coherence of an OTTx module, a is a constant, α represents a value, and the * represents a multiplication operation.

8. The method of claim 6, wherein, in the calculating of the first spatial information for the up-mixing of the down-mixed mono signal to the stereo signal, the first spatial information for the up-mixing of the down-mixed mono signal to the stereo signal is calculated by searching within a table storing spatial information about an energy ratio or difference between the predetermined channels in the multi-channels or spatial information corresponding to the correlation or coherence between the predetermined channels in the multi-channels.

9. The method of claim 1, further comprising applying temporal processing (TP) or temporal envelope shaping (TES) to the stereo signal.

10. A method for generating an audio signal, comprising:
selectively up-mixing a down-mixed mono signal to at least one of a multi-channel signal and a stereo signal,
wherein up-mixing of the down-mixed mono signal to the multi-channel signal is accomplished through multi-staged up-mixings of the down-mixed mono signal based upon first spatial information for up-mixing the down-mixed mono signal to the multi-channel signal, and
wherein up-mixing of the down-mixed mono signal to the stereo signal is accomplished by calculating, using at least one processor, second spatial information for the up-mixing of the down-mixed mono signal to the stereo signal based on the first spatial information for up-mixing the down-mixed mono signal to the multi-channel signal, and by applying the calculated second spatial information to a single-staged up mixing to up-mix the down-mixed mono signal to the stereo signal differently from any stage of the multi-staged up-mixings of the down-mixed mono signal to any multi-channel signal in the up-mixing of the down-mixed mono signal to the multi-channel signal.

11. The method of claim 10, wherein selection of the up-mixing of the down-mixed mono signal to the at least one of the multi-channel signal and the stereo signal is based upon a number of speakers available in a corresponding decoding system or locations of available speakers among speakers included in the corresponding decoding system.

12. A method for generating an audio signal, comprising:
selectively up-mixing a down-mixed mono signal to at least one of a multi-channel signal and a stereo signal,
wherein up-mixing of the down-mixed mono signal to the multi-channel signal is accomplished through a multi-staged up-mixing of the down-mixed mono signal based upon first spatial information for up-mixing the down-mixed mono signal to the multi-channel signal, and
wherein up-mixing of the down-mixed mono signal to the stereo signal is accomplished by calculating, using at least one processor, second spatial information for the up-mixing of the down-mixed mono signal to the stereo signal based on the first spatial information for up-mixing the down-mixed mono signal to the multi-channel signal, and by applying the calculated second spatial information to a single stage to up-mix the down-mixed mono signal to the stereo signal, wherein the first spatial information for the up-mixing of the down-mixed mono signal to the multi-channel signal pre-exists as being generated by an encoder that generates the down-mixed mono signal.

13. At least one non-transitory computer readable medium comprising computer readable code to control at least one processing element to implement the method of claim 1.

14. At least one non-transitory computer readable medium comprising computer readable code to control at least one processing element to implement the method of claim 10.

15. A system for generating a stereo signal, comprising:
a spatial information generator to calculate first spatial information for up-mixing a down-mixed mono signal to the stereo signal, using second spatial information for up-mixing the down-mixed mono signal to a multi-channel signal other than the stereo signal; and
an up-mixing unit to up-mix the down-mixed mono signal to the stereo signal, using the calculated first spatial information for up-mixing the down-mixed mono signal to the stereo signal,
wherein the second spatial information for up-mixing the down-mixed mono signal to the multi-channel signal other than the stereo signal pre-exists as being generated by an encoder that generates the down-mixed mono signal.

16. The system of claim 15, wherein the first spatial information for the up-mixing of the down-mixed mono signal to the stereo signal includes information about an energy ratio or difference between predetermined channels in multi-channels.

17. The system of claim 16, wherein the spatial information generator comprises:
a first summing unit to sum an energy sum of channels corresponding to a left channel with a value obtained by multiplying energy of a front center channel by a predetermined value, as a left channel sum;
a second summing unit summing an energy sum of channels corresponding to a right channel with a value obtained by multiplying energy of a front center channel by another predetermined value, as a right channel sum; and
an information generator calculating the first spatial information for the up-mixing of the down-mixed mono signal to the stereo signal using a ratio of the left and right channel sums.

18. The system of claim 17, wherein the spatial information generator calculates the first spatial information for the up-mixing of the down-mixed mono signal to the stereo signal, using the following equation:

$$CLD'=(P_{FL}+P_{BL}+a*P_{FC})/(P_{FR}+P_{BR}+b*P_{FC})$$

where CLD' denotes an energy ratio between channels included in the calculated first spatial information, PFL denotes energy of a front left (FL) channel, PBL denotes energy of a back left (BL) channel, PFC denotes energy of a front center (FC) channel, PFR denotes energy of a front right (FR) channel, PBR denotes energy of a back right (BR) channel, a and b are constants, and the * represents a multiplication operation.

19. The system of claim 15, wherein the first spatial information for the up-mixing of the down-mixed mono signal to the stereo signal includes information about correlation or coherence between predetermined channels in multi-channels.

20. The system of claim 19, wherein the spatial information generator calculates the first spatial information for the up-mixing of the down-mixed mono signal to the stereo signal, by linear interpolation, using the correlation or coherence between the predetermined channels in the multi-channels.

21. The system of claim 20, wherein the spatial information generator calculates the first spatial information for the up-mixing of the down-mixed mono signal to the stereo signal, using the following equation:

$$ICC'=\alpha*ICC_a+(1\times\alpha)*ICC_b$$

where ICC' denotes the correlation or coherence between the predetermined channels, ICC0 denotes correlation or coherence of an OTTx module, a is a constant, a represents a value, and the * represents a multiplication operation.

22. The system of claim 19, wherein the spatial information generator calculates the first spatial information for the up-mixing of the down-mixed mono signal to the stereo signal, by searching for spatial information about an energy ratio or difference between the predetermined channels in the multi-channels or correlation or coherence between the predetermined channels in the multi-channels, from a table storing the spatial information about the energy ratio or difference between the predetermined channels in the multi-channels or the spatial information corresponding to the correlation or coherence between the predetermined channels in the multi-channels.

23. The system of claim 15, further comprising a TP/TES applying unit to apply temporal processing (TP) or temporal envelope shaping (TES) to the stereo signal.

24. An system for generating an audio signal, comprising:
a plurality of up-mixing modules to selectively up-mix a down-mixed mono signal to at least one of a stereo signal and a multi-channel signal; and
a spatial information generator to calculate first spatial information for up-mixing the down-mixed mono signal to the stereo signal, using second spatial information for up-mixing the down-mixed mono signal to the multi-channel signal,
wherein up-mixing of the down-mixed mono signal to the multi-channel signal is accomplished through multi-staged up-mixings by the plurality of up-mixing modules based upon the second spatial information for up-mixing the down-mixed mono signal to the multi-channel signal, and
wherein up-mixing of the down-mixed mono signal to the stereo signal is accomplished through a single-staged up-mixing by one of the plurality of up-mixing modules based upon the calculated first spatial information for the up-mixing of the down-mixed mono signal to the stereo signal differently from any stage of the multi-staged up-mixings of the down-mixed mono signal to any multi-channel signal in the up-mixing of the down-mixed mono signal to the multi-channel signal.

25. The system of claim 24, wherein the selection of the up-mixing of the down-mixed mono signal to at least one of the multi-channel signal and the stereo signal is based upon a number of speakers available in a corresponding decoding system or locations of available speakers among speakers included in the corresponding decoding system.

26. A system for generating an audio signal, comprising:
a plurality of up-mixing modules to selectively up-mix a down-mixed mono signal to at least one of a stereo signal and a multi-channel signal; and
a spatial information generator to calculate first spatial information for up-mixing the down-mixed mono signal to the stereo signal, using second spatial information for up-mixing the down-mixed mono signal to the multi-channel signal,
wherein up-mixing of the down-mixed mono signal to the multi-channel signal is accomplished through staged up-mixing by the plurality of up-mixing modules based upon the second spatial information for up-mixing the down-mixed mono signal to the multi-channel signal, and
wherein up-mixing of the down-mixed mono signal to the stereo signal is accomplished through a single up-mixing by one of the plurality of up-mixing modules based upon the calculated first spatial information for the up-mixing of the down-mixed mono signal to the stereo signal, wherein the second spatial information for the up-mixing of the down-mixed mono signal to the multi-channel signal pre-exists as being generated by an encoder that generates the down-mixed mono signal.

27. A method for generating a stereo signal, comprising:
calculating, using at least one processor, first information including channel level differences and inter-channel correlation for up-mixing a down-mixed mono signal to the stereo signal, based on second information including channel level differences and inter-channel correlation for up-mixing a multi-channel signal, other than the stereo signal, from a down-mixed mono signal; and
up mixing the down-mixed mono signal transmitted from the encoder to the stereo signal using the calculated first information including the channel level differences and the inter-channel correlation.

28. A method for generating a stereo signal, comprising:
calculating, using at least one processor, first spatial information for up-mixing a down-mixed mono signal to the stereo signal, based on second spatial information for up-mixing a down-mixed mono signal to a multi-channel signal other than the stereo signal, and including channel level differences and inter-channel correlation; and
up-mixing the down-mixed mono signal to the stereo signal by an OTT module, using the calculated first spatial information,
wherein the calculated first spatial information is obtained from a power ratio between a first power and second power, and the first power is calculated using power of a front left channel, power of a back left channel, and power of a front center channel of the multi-channel signal, and the second power is calculated using power of a front right channel, power of a back right channel, and the power of the front center channel of the multi-channel signal.

29. A method for generating a stereo signal from a down-mixed mono signal, the method comprising:
calculating, using at least one processor, first spatial parameters for up-mixing the down-mixed mono signal to the stereo signal, based on second spatial parameters for up-mixing the down-mixed mono signal to a multi-channel signal other than the stereo signal which are used; and
generating the stereo signal from the down-mixed mono signal by using the first spatial parameters.

30. The method of claim 29, wherein the first spatial parameters include Channel Level Difference (CLD) and Inter-Channel Correlation (ICC).

31. The method of claim 30, wherein the CLD included in the first spatial parameters is calculated by using a power ratio between a first power and a second power,
- wherein the first power is obtained using power of a front left channel, power of a back left channel and power of a front center channel, of the multi-channel signal and
- the second power is obtained using power of a front center channel, power of a front right channel and power of a back right channel, of the multi-channel signal.

\* \* \* \* \*